United States Patent [19]
Anderson, III et al.

[11] Patent Number: 4,510,490
[45] Date of Patent: Apr. 9, 1985

[54] CODED SURVEILLANCE SYSTEM HAVING MAGNETOMECHANICAL MARKER

[75] Inventors: Philip M. Anderson, III, Chatham, N.J.; James E. Kearney, New Hyde Park, N.Y.; Gerald R. Bretts, Livingston, N.J.

[73] Assignee: Allied Corporation, Morris Township, Morris County, N.J.

[21] Appl. No.: 384,814

[22] Filed: Jun. 3, 1982

Related U.S. Application Data

[63] Continuation-in-part of Ser. No. 373,061, Apr. 29, 1982.

[51] Int. Cl.³ .............................................. G08B 13/26
[52] U.S. Cl. ...................................... 340/572; 340/551
[58] Field of Search ............... 340/572, 552, 561, 567, 340/568, 551; 343/6.8 R, 6.5 R, 6.5 SS, 6.8 LC; 324/201, 260

[56] References Cited

U.S. PATENT DOCUMENTS

| | | | |
|---|---|---|---|
| 3,856,513 | 12/1974 | Chen et al. | 75/123 B |
| 3,990,065 | 11/1976 | Purinton et al. | 340/572 |
| 4,158,434 | 6/1979 | Peterson | 340/572 |
| 4,215,342 | 7/1980 | Horowitz | 340/572 |
| 4,298,862 | 11/1981 | Gregor et al. | 340/572 |
| 4,321,586 | 3/1982 | Cooper et al. | 340/572 |

FOREIGN PATENT DOCUMENTS 763681   2/1934   France .

*Primary Examiner*—Donnie L. Crosland
*Attorney, Agent, or Firm*—Ernest D. Buff; Gerhard H. Fuchs; Paul Yee

[57] ABSTRACT

A magnetic article surveillance system marker is adapted, when armed, to resonate at preselected frequencies provided by an incident magnetic field applied within an interrogation zone. The marker is a plurality of elongated ductile strips of magnetostrictive ferromagnetic material each of the strips being disposed adjacent to a ferromagnetic element which, upon being magnetized, magnetically biases the strips and arms them to resonate at the preselected frequencies. A substantial change in effective magnetic permeability of the marker at the preselected frequencies provides the marker with signal identity.

33 Claims, 8 Drawing Figures

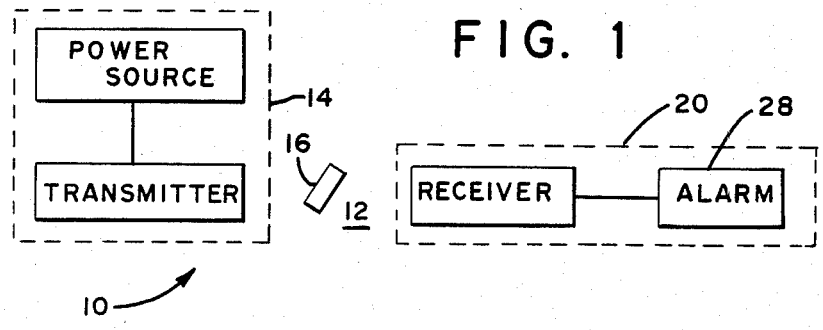
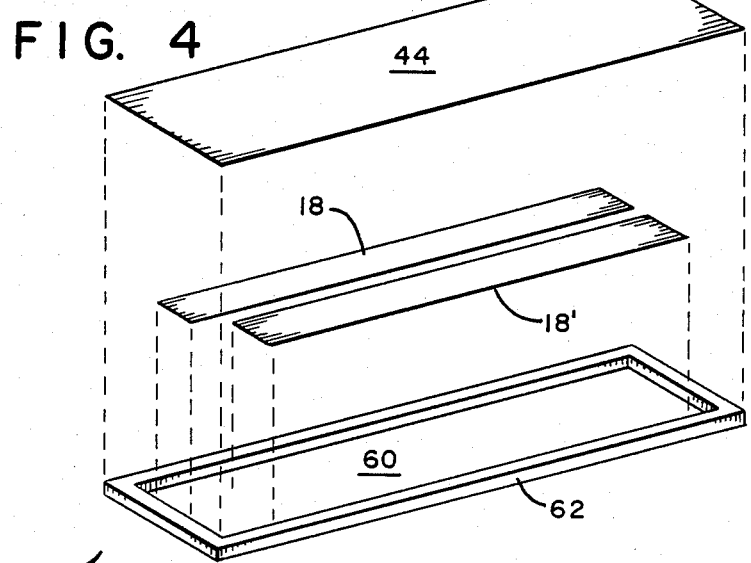
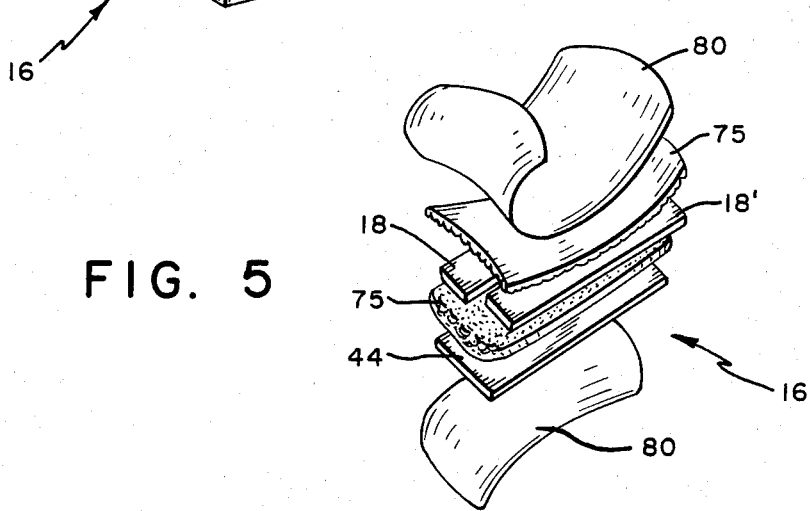

CODED SURVEILLANCE SYSTEM HAVING MAGNETOMECHANICAL MARKER

CROSS REFERENCE TO RELATED APPLICATIONS

This application is a continuation-in-part of copending application Ser. No. 373,061, filed Apr. 29, 1982, entitled "Surveillance Systems having Magnetomechanical Markers".

BACKGROUND OF THE INVENTION

1. Field of the Invention

This invention relates to article surveillance systems and markers for use therein. More particularly, the invention provides a coded ferromagnetic metal marker that enhances the sensitivity and reliabilty of the article surveillance system.

2. Description of the Prior Art

The problem of protection of articles of merchandise and the like, against theft from retail stores has been the subject of numerous technical solutions. Among these, a tag or marker is secured to an article to be protected. The marker responds to an interrogation signal from transmitting apparatus situated either at the exit door of the premises to be protected, or at the aisleway adjacent to the cashier or check out station. A receiving coil on the opposite side of the exit or aisleway from the transmitting apparatus, receives a signal produced by the marker in response to the interrogation signal. The presence of the response signal indicates that the marker has not been removed or deactivated by the cashier, and that the article bearing it may not have been paid for or properly checked out.

Several different types of markers have been disclosed in the literature, and are in use. In one type, the functional portion of the marker consists of either an antenna and diode or an antenna and capacitors forming a resonant circuit. When placed in an electromagnetic field transmitted by the interrogation apparatus, the antenna-diode marker generates harmonics of the interrogation frequency in the receiving antenna; the resonant circuit marker causes an increase in absorption of the transmitted signal so as to reduce the signal in the receiving coil. The detection of the harmonic or signal level change indicates the presence of the marker. With this type of system, the marker must be removed from the merchandise by the cashier. Failure to do so indicates that the merchandise has not been properly accounted for by the cashier.

A second type of marker consists of a first elongated element of high magnetic permeability ferromagnetic material disposed adjacent to at least a second element of ferromagnetic material having higher coercivity than the first element. When subjected to an interrogation frequency of electromagnetic radiation, the marker causes harmonics of the interrogation frequency to be developed in the receiving coil. The detection of such harmonics indicates the presence of the marker. Deactivation of the marker is accomplished by changing the state of magnetization of the second element. Thus, when the marker is exposed to a dc magnetic field, the state of magnetization in the second element changes and, depending upon the design of the marker being used, either the amplitude of the harmonics chosen for detection is significantly reduced, or the amplitude of the even numbered harmonics is significantly changed. Either of these changes can be readily detected in the receiving coil.

Ferromagnetic harmonic generating markers are smaller, contain fewer components and materials, and are easier to fabricate than resonant-circuit or antenna-diode markers. As a consequence, the ferromagnetic marker can be treated as a disposable item affixed to the article to be protected and disposed of by the customer. Such markers may be readily deactivated by the application of a magnetic field pulse triggered by the cashier. Hence, handling costs associated with the physical removal requirements of resonant-circuit and antenna-diode markers are avoided.

One of the problems with harmonic generating, ferromagnetic markers is the difficulty of detecting the marker signal at remote distances. The amplitude of the harmonics developed in the receiving antenna is much smaller than the amplitude of the interrogation signal, with the result that the range of detection of such markers has heretofore been limited to aisle widths less than about three feet. Another problem with harmonic generating, ferromagnetic markers is the difficulty of distinguishing the marker signal from pseudo signals generated by belt buckles, pens, hair clips and other ferromagnetic objects carried by shoppers. The merchant's fear of embarrassment and adverse legal consequences associated with false alarms triggered by such pseudo signals will be readily appreciated. Yet another problem with such ferromagnetic markers is their tendency to be deactivated or reactivated by conditions other than those imposed by components of the system. Thus, ferromagnetic markers can be deactivated purposely upon juxtaposition of a permanent magnet or reactivated inadvertently by magnetization loss in the second ferromagnetic element thereof. Still another problem with harmonic generating ferromagnetic markers is the difficulty of distinguishing one marker from another. For these reasons, article surveillance systems have resulted in higher operating costs and lower detection sensitivity and operating reliability than are considered to be desirable.

SUMMARY OF THE INVENTION

The present invention provides a marker capable of producing identifying signal characteristics in the presence of a magnetic field applied thereto by components of an article surveillance system. The marker has high signal amplitude and a controllable signal signature and is not readily deactivated or reactivated by conditions other than those imposed by components in the system. In one aspect of the invention, the marker signal contains plural signal criteria which permit differentiation among a plurality of markers appointed for interrogation by the article surveillance system. In another aspect of the invention, such differentiation is accomplished by signal modification of markers having single signal criteria.

In addition, the invention provides an article surveillance system responsive to the presence within an interrogation zone of an article to which an encoded marker is secured. The system provides for high selectivity and is characterized by a high signal-to-noise ratio and encoded markers having signal criteria that permit differentiation among a plurality of markers upon interrogation thereof. Briefly stated, the system has means for defining an interrogation zone. Means are provided for generating a magnetic field of varying frequency within the interrogation zone. A marker is secured to an article appointed for passage through the interrogation zone. The marker comprises a plurality of elongated, ductile strips of magnetostrictive ferromagnetic material each of the strips being adapted to be magnetically biased and and thereby armed to resonate mechanically at a different preselected frequency within the frequency band of the incident magnetic field. A hard ferromagnetic element, disposed adjacent to the strips of magnetostrictive material, is adapted, upon being magnetized, to arm each of the strips to resonate at its preselected frequency. Each of the strips of magnetostrictive material has a magnetomechanical coupling factor, k, greater than 0, where $k=\sqrt{(1-f_r^2/f_a^2)}$, $f_r$ and $f_a$ being the resonant and antiresonant frequencies, respectively. Upon exposure to said magnetic bias each of the strips is characterized by a substantial change in its effective magnetic permeability at its preselected frequency as the applied ac field sweeps through each of the resonant frequencies thereof that provides the marker with signal identity. A detecting means detects the change in coupling between the interrogating and receiving coils at each different preselected frequency, and distinguishes it from changes in coupling at other frequencies.

BRIEF DESCRIPTION OF THE DRAWINGS

The invention will be more fully understood and further advantages will become apparent when reference is made to the following detailed description of the preferred embodiment of the invention and the accompanying drawings in which:

FIG. 1 is a block diagram of an article surveillance system incorporating the present invention;

FIG. 4 is an isometric view showing components of a marker adapted for use in the system of FIG. 1;

FIG. 5 is an isometric view showing a flexible casing adapted to protect the marker of FIG. 4 against damping;

DESCRIPTION OF THE PREFERRED EMBODIMENTS

The magnetomechanical marker of article surveillance system 10 can be fabricated in a number of diverse sizes and configurations. As a consequence, the invention will be found to function with many varieties of surveillance systems. For illustrative purposes the invention is described in connection with an antipilferage system wherein articles of merchandise bearing the markers are surveyed by the system to prevent theft of the merchandise from a retail store. It will be readily appreciated that the invention can be employed for similar and yet diversified uses, such as the identification of articles or personnel, wherein the marker and the system exchange magnetomechanical energy so that the marker functions as (1) personnel badge for control of access to limited areas, (2) a vehicle toll or access plate for actuation of automatic sentrys associated with bridge crossings, parking facilities, industrial sites or recreational sites, (3) an identifier for check point control of classified documents, warehouse packages, library books and the like, and (4) product verification. Accordingly, the invention is intended to encompass modifications of the preferred embodiment wherein one or more resonant frequencies of the marker provides animate or inanimate objects (hereinafter referred to as "articles") bearing it with signal identity.

Figure 2:
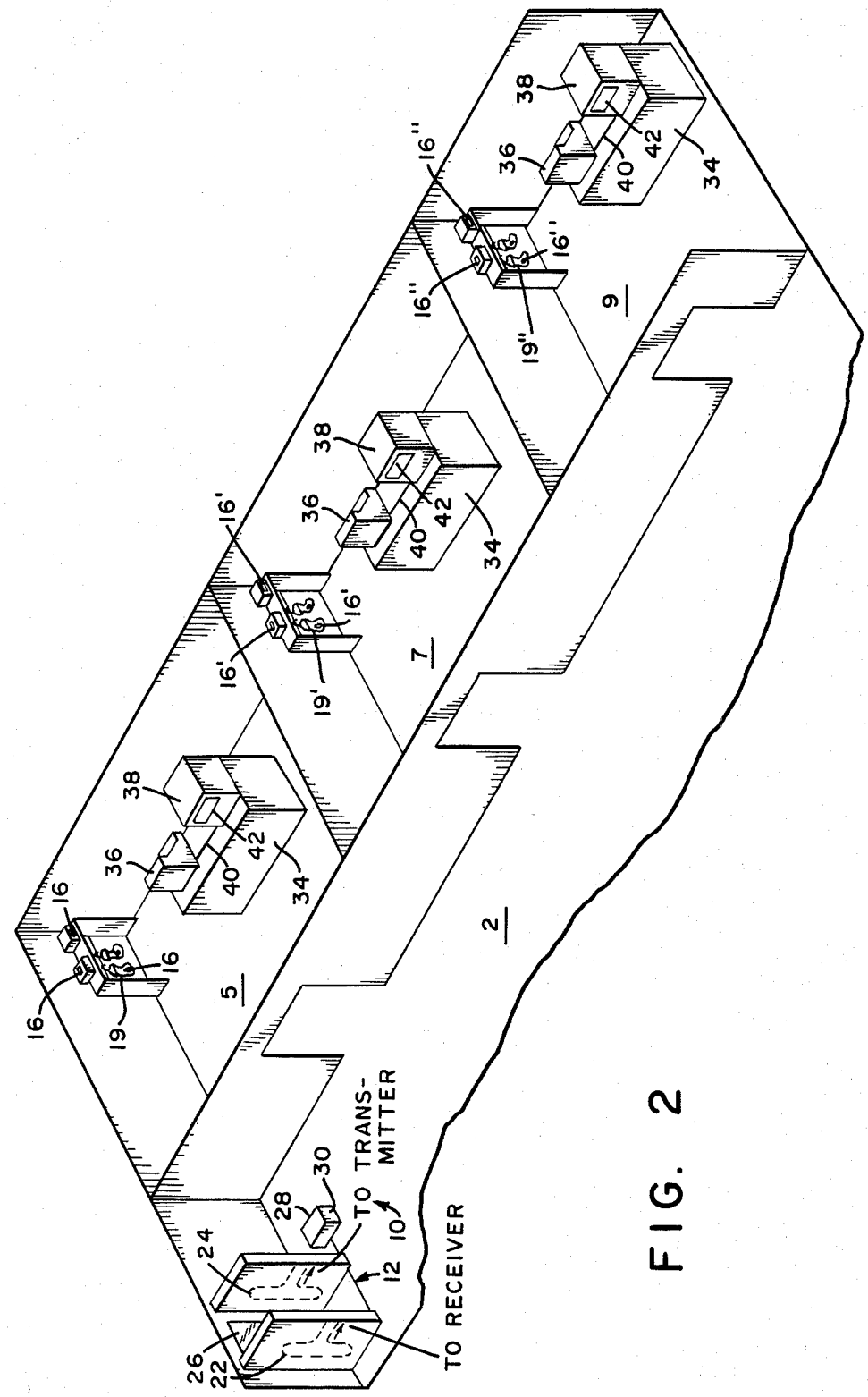
FIG. 2 is a diagrammatic illustration of typical store installations of the system of FIG. 1, the stores being located in a shopping mall.

Referring to FIGS. 1, 2 and 4 of the drawings, there is shown an article surveillance system 10 responsive to the presence of an article within an interrogation zone. The system 10 has means for defining an interrogation zone 12. A field generating means 14 is provided for generating a magnetic field of variable frequency within interrogation zone 12. A marker 16 is secured to an article 19 appointed for passage through the interrogation zone 12. The marker comprises a plurality of elongated ductile strips 18, 18' of magnetostrictive, ferromagnetic material adapted, when armed, to resonate mechanically at preselected frequencies within the rate of the incident magnetic field. A hard ferromagnetic element 44 disposed adjacent to each of the strips 18, 18' of magnetostrictive material is adapted, upon being magnetized, to magnetically bias the strips 18, 18' and thereby arm them to resonate at their preselected frequencies. Each of the strips 18, 18' has a magnetomechanical coupling factor, k, greater than 0, where $k=\sqrt{(1-f_r^2/f_a^2)}$, $f_r$ and $f_a$ being the resonant and anti-resonant frequencies, respectively.

Upon exposure to the magnetic field within interrogation zone 12, marker 16 is characterized by a substantial change in its effective magnetic permeability at the resonant and/or anti-resonant frequency (shown in FIG. 3 as $f_r$ and $f_a$) of which each of the preselected frequencies are comprised that provides marker 16 with signal identity. A detecting means 20 is arranged to detect changes in coupling produced in the vicinity of the interrogation zone 12 by the presence of marker 16 therewithin.

In another aspect of the invention, the article surveillance system 10 is responsive to the presence of at least one of a plurality of markers within interrogation zone 12. Field generating means 14 generates a magnetic field having a frequency band within interrogation zone 12. A plurality of markers 16, 16', 16" are appointed for passage through interrogation zone 12. Each of the markers 16, 16', 16" is characterized by a substantial change in its effective magnetic permeability at a different preselected frequency within the frequency band that provides the markers with signal identity. Each marker comprises an elongated ductile strip of magnetostrictive, ferromagnetic material adapted to be magnetically biased and thereby armed to resonate mechanically at a frequency within the frequency band of the magnetic field. A detecting means detects resonances of the markers within the interrogation zone at each different preselected frequency.

Typically, the system 10 includes a pair of coil units 22, 24 disposed on opposing sides of a path leading to the exit 26 of a shopping mall 2 comprising a plurality of stores. Detection circuitry, including an alarm 28, is housed within a cabinet 30 located near the mall 2 exit 26. Articles of merchandise 19, 19', 19" such as wearing apparel, appliances, books and the like are displayed within the stores. Each of the articles 19, 19', 19" has secured thereto a marker 16, 16', 16", constructed in accordance with the present invention. As shown in FIG. 4, the marker 16, 16', 16" includes a plurality of elongated, ductile magnetostrictive ferromagnetic strips 18, 18' that are normally in an activated mode. When marker 16, 16', 16" is in the activated mode, placement of an article 19, 19', 19" between coil units 22 and 24 of interrogation zone 12 will cause an alarm to be emitted from cabinet 30. In this manner, the system 10 prevents unauthorized removal of articles of merchandise 19, 19', 19" from the mall 2.

The resonant frequencies of the markers 16, of store 5 differ from those of the markers 16' of store 7. Similarly, the resonant frequencies of the markers 16" of store 9 differ from those of the markers 16, 16' of stores 5 and 7, respectively. Detection means 20 is provided with logic circuitry responsive to the different preselected frequencies of markers 16, 16', 16", for actuating an audible or visual signal (such as a voice synthesized message, an illuminated sign or the like) that indicates the store from which each of markers 16, 16', 16" originated. In this manner, the system 10 avoids the necessity for duplicating the detection and interrogation components, which are relatively expensive.

Referring now to the illustration of store 5 in FIG. 2, disposed on a checkout counter near cash register 36 is a deactivator system 38. The latter can be electrically connected to cash register 36 by wire 40. Articles 19 that have been properly paid for are placed within an aperture 42 of deactivation system 38, whereupon a magnetic field is applied to marker 16. The deactivation system 38 has detection circuitry adapted to activate a desensitizing circuit in response to coupling signals generated by marker 16. The desensitizing circuit applies to marker 16 a magnetic field that places the marker 16 in a deactivated mode, by either increasing or decreasing the magnetic bias field strength of the hard ferromagnetic material, by an amount sufficient to move the $f_r$ and $f_a$ outside of the frequency range of the applied field or to decrease the coupling factor k sufficiently to make it undetectable. The article 19 carrying the deactivated marker 16 may then be carried through interrogation zone 12 without triggering the alarm 28 in cabinet 30. Deactivation of markers 16', 16" in stores 7 and 9 is effected in the same manner by the deactivation system 38 located therewithin.

The theft detection system circuitry with which the marker 16 is associated can be any system capable of (1) generating within an interrogation zone an incident magnetic field of variable frequency, (2) detecting changes in coupling at frequencies produced in the vicinity of the interrogation zone by the presence of the marker and (3) distinguishing the particular resonant and/or anti-resonant changes in coupling of the marker at different preselected frequencies provided by strips 18, 18' from other variations in signals detected.

Such systems typically include means for transmitting a varying electrical current from an oscillator and amplifier through conductive coils that form a frame antenna capable of developing a varying magnetic field. An example of such antenna arrangement is disclosed in French Pat. No. 763,681, published May 4, 1934, which description is incorporated herein by reference thereto.

In accordance with a preferred embodiment of the invention, marker 16 comprises a plurality of strips 18, 18', each of which is composed of a magnetostrictive amorphous metal alloy. Each of the strips 18, 18' is elongated, ductile and composed of a composition consisting essentially of the formula $M_aN_bO_cX_dY_eZ_f$, where M is at least one of iron and cobalt, N is nickel, O is at least one of chromium and molybdenum, X is at least one of boron and phosphorous, Y is silicon, Z is carbon, "a"-"f" are in atom percent, "a" ranges from about 35-85, "b" ranges from about 0-45, "c" ranges from about 0-7, "d" ranges from about 5-22, "e" ranges from about 0-15 and "f" ranges from about 0-2, and the sum of d+e+f ranges from about 15-25.

It has been found that strips 18, 18' of material having the formula specified above are particularly adapted to resonate mechanically at preselected frequencies of an incident magnetic field. While we do not wish to be bound by any theory, it is believed that, in markers of the aforesaid composition, direct magnetic coupling between an arc magnetic field and the marker 16 occurs by means of the following mechanism.

When a ferromagnetic material such as an amorphous metal ribbon is in a magnetic field (H), the ribbon's magnetic domains are caused to grow and/or rotate. This domain movement allows magnetic energy to be stored, in addition to a small amount of energy which is lost as heat. When the field is removed, the domains return to their original orientation releasing the stored magnetic energy, again minus a small amount of energy lost as heat. Amorphous metals have high efficiency in this mode of energy storage. Since amorphous metals have no grain boundaries and have high resistivities, their energy losses are extraordinarily low.

When the ferromagnetic ribbon is magnetostrictive, an additional mode of energy storage is also possible. In the presence of a magnetic field, a magnetostrictive amorphous metal ribbon will have energy stored magnetically as described above but will also have energy stored mechanically via magnetostriction. This mechanical energy stored can be quantified as $U_e=(\frac{1}{2})$ TS where T and S are the stress and strain on the ribbon. This additional mode of energy storage may be viewed as an increase in the effective magnetic permeability of the ribbon.

When an ac magnetic field and a dc field are introduced on the magnetostrictive ribbon (such as can be generated by ac and dc electric currents in a solenoid), energy is alternately stored and released with the frequency of the ac field. The magnetostrictive energy storage and release are maximal at the material's mechanical resonance frequency and minimal at its anti-resonance. This energy storage and release induces a voltage in a pickup coil via flux density changes in the ribbon. The flux density change may also be viewed as an increase in effective magnetic permeability at the resonant frequency and a decrease at anti-resonance, thus, in effect, increasing or decreasing, respectively, the magntic coupling between the driving solenoid and a second pickup solenoid. The voltage induced by the purely magnetic energy exchange is linear with frequency and the change in voltage with frequency is small over a limited frequency range. The voltage induced by the magnetomechanical energy exchange is also linear with frequency except near mechanical resonance. For a thin ribbon the mechanical resonance frequency is given by:

$$f_R=(n/2L)(E/D)^{\frac{1}{2}}$$

where L, E and D are the length, Youngs modulus and mass density of the ribbon and n indicates the order of the harmonic. Therefore, when the frequency of the ac magnetic field is swept around $f_R$, a characteristic signature is generated. The resonance peak is closely followed by an anti-resonance peak shown in FIG. 3. This anti-resonant peak occurs when the mechanical energy stored is near zero.

The transfer of magnetic and mechanical energy described above is called magnetomechanical coupling (MMC), and can be seen in all magnetostrictive materials. The efficiency of this energy transfer is proportional to the square of the magnetomechanical coupling factor (k), and is defined as the ratio of mechanical to magnetic energy. Phenomenologically, k is defined as $k = \sqrt{(1 - f_r^2/f_a^2)}$ where $f_r$ and $f_a$ are the resonant and anti-resonant frequencies described above. The larger the k factor, the greater the voltage difference between resonant peak and anti-resonant valley. Also, the larger the k, the larger the difference in frequency between resonance and anti-resonance. Therefore, a large k facilitates the observation of the MMC phenomena.

Coupling factors are influenced in a given amorphous metal by the level of bias field present, the level of internal stress (or structural anisotropy) present and by the level and direction of any magnetic anisotropy. Annealing an amorphous metal relieves internal stresses, thus enhancing k. The structural anisotropy is small due to the ribbon's amorphous nature, also enhancing k. Annealing in a properly oriented magnetic field can significantly enhance coupling factors. Domain movement can be maximized when the ribbon has a magnetic anisotropy which is perpendicular to the interrogating field. Because of demagnetizing field effects, it is practical to interrogate the ribbon only along its length (this being the longest dimension). Therefore, the induced magnetic anisotropy should be transverse to the long dimension of the ribbon.

Maximum values of k are obtained by annealing the ribbon in a saturating magnetic field which is perpendicular to ribbon length (cross-field annealed). For a ½ inch ribbon, a field of a few hundred oersted is required. The optimum time and temperature of the anneal depends on the alloy employed. As an example, an iron-boron-silicon alloy yields an optimum coupling (k>0.90) when cross-field annealed at 400° C. for 30 minutes. This anneal yields an optimum bias field of 1 Oe. For alloys having the compositions specified hereinabove, the annealing temperature ranges from about 300° to 450° C. and the annealing time ranges from about 7 to 120 min.

The anneal also affects the bias field required to optimize k. For a given amorphous metal with a given anneal, the coupling depends strongly on the bias field. At zero and saturating fields, the coupling is zero (no resonant and anti-resonant phenomena). For a given alloy, an optimum bias field exists which yields a maximum k. For alloys having the compositions specified herein, the bias field required to optimize k ranges from about 0.1 to 20 Oe.

Even though most magnetostrictive materials will exhibit some MMC, amorphous metal yield extremely high coupling factors, and are, therefore highly preferred. As-cast amorphous metals yield higher k than most other magnetostrictive materials. No material has higher k than amorphous metals when cross-field annealed. Amorphous metals have high k because they have:

(a) low magnetic losses (no grain boundries, high resistivity), (b) low structural and stress anisotropy, (c) reasonable magnetostriction and (d) can be given a beneficial magnetic anisotropy.

Amorphous metal alloys make good markers because (a) they have high k-even as-cast, (b) they are mechanically strong, tough and ductile, (c) they require low bias fields and (d) they have extremely high magnetostrictivity (they develop a large force upon resonating and are, therefore, more difficult to damp out). It will be appreciated, therefore, that the amorphous metals of which the marker of this invention is composed need not be annealed, but may be incorporated into the marker "as cast".

Examples of amorphous ferromagnetic marker compositions in atomic percent within the scope of the invention are set forth below in Table 1.

TABLE 1

| ALLOY | AS-CAST k | OPTIMAL ANNEALED k |
|---|---|---|
| $Fe_{78}Si_9B_{13}$ | 0.35 | >0.90 |
| $Fe_{79}Si_5B_{16}$ | 0.31 | >0.90 |
| $Fe_{81}B_{13.5}Si_{3.5}C_2$ | 0.22 | >0.90 |
| $Fe_{67}Co_{18}B_{14}Si_1$ | 0.45 | 0.72 |
| $Fe_{40}Ni_{38}Mo_4B_{18}$ | 0.23 | 0.50 |

Examples of amorphous metals that have been found unsuitable for use as article surveillance system markers are set forth in Table 2.

TABLE 2

| | COMPOSITION PERCENT | | |
|---|---|---|---|
| | EXAMPLE 1 | | EXAMPLE 2 |
| Ni | at. % 71.67 | Ni | at. % 65.63 |
| | wt. % 84.40 | | wt. % 76.97 |
| Cr | at. % 5.75 | Cr | at. % 11.55 |
| | wt. % 6 | | wt. % 12.0 |
| B | at. % 12.68 | B | at. % 11.58 |
| | wt. % 2.75 | | wt. % 2.5 |
| Si | at. % 7.10 | Si | at. % 7.13 |
| | wt. % 4 | | wt. % 4 |
| Fe | at. % 2.23 | Fe | at. % 3.14 |
| | wt. % 2.5 | | wt. % 3.5 |
| C | at. % .25 | C | at. % .12 |
| | wt. % .06 | | wt. % .03 |
| P | at. % .032 | P | at. % — |
| | wt. % .02 | | wt. % — |
| S | at. % .031 | S | at. % — |
| | wt. % .02 | | wt. % — |
| Al | at. % .093 | Al | at. % — |
| | wt. % .05 | | wt. % — |
| Ti | at. % .052 | Ti | at. % — |
| | wt. % .05 | | wt. % — |
| Zr | at. % .027 | Zr | at. % — |
| | wt. % .05 | | wt. % — |
| Co | at. % .085 | Co | at. % .85 |
| | wt. % .1 | | wt. % 1.0 |

The amorphous ferromagnetic metal marker of the invention is prepared by cooling a melt of the desired composition at a rate of at least about $10^{5}$° C./sec, employing metal alloy quenching techniques well-known to the amorphous metal alloy art; see, e.g., U.S. Pat. No. 3,856,513 to Chen et al. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, metastable, homogeneous, ductile material is obtained. The metastable material may be amorphous, in which case there is no long-range order. X-ray diffraction patterns of amorphous metal alloys show only a diffuse halo, similar to that observed for inorganic oxide glasses. Such amorphous alloys must be at least 50% amorphous to be sufficiently ductile to permit subsequent handling, such as stamping complex marker shapes from ribbons of the alloys without degradation of the marker's signal identity. Preferably, the amorphous metal marker must be at least 80% amorphous to attain superior ductility.

The metastable phase may also be a solid solution of the constituent elements. In the case of the marker of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

The magnetostrictive strips 18, 18' of which marker 16 is comprised are advantageously produced in foil (or ribbon) form, and may be used in theft detection applications when the material is amorphous or a solid solution. Alternatively, foils of amorphous metal alloys may be heat treated to obtain a crystalline phase, preferably fine-grained, in order to promote longer die life when stamping of complex marker shapes is contemplated.

The amorphous ferromagnetic material of strips 18, 18' is exceedingly ductile. By ductile is meant that the strips 18, 18' can be bent around a radius as small as ten times the foil thickness without fracture. Such bending of the strips 18, 18' produces little or no degradation in magnetic properties generated by the marker upon application of the interrogating magnetic field thereto. As a result, the marker retains its signal identity despite being flexed or bent during (1) manufacture (e.g., cutting, stamping or otherwise forming the strips 18, 18' into the desired length and configuration) and, optionally, applying hard magnetic biasing magnets thereto to produce an on/off marker, (2) application of the marker 16 to the protected articles 19, (3) handling of the articles 19 by employees and customers and (4) attempts at signal destruction designed to circumvent the system 10.

In assembly of marker 16, strips 18, 18' are disposed adjacent to a ferromagnetic element 44, such as a biasing magnet capable of applying a dc field to strip 18. The biasing magnet has a configuration and disposition adapted to provide each of strips 18, 18' with a single pair of magnetic poles, each of the poles being at opposite extremes of the long dimension of each of strips 18, 18'. The composite assembly is then placed within the hollow recess 60 of a rigid container 62 composed of polymeric material such as polyethylene or the like, to protect the assembly against mechanical damping. The biasing magnet 44 is typically a flat strip of high coercivity material such as SAE 1095 steel, Vicalloy, Remalloy or Arnokrome. Such biasing magnet 44 is held in the assembly in a parallel, adjacent plane, such that the high coercivity material does not cause mechanical interference with the vibration of the strips 18, 18'. Generally, biasing magnet 44 acts as one surface of the package. Alternatively, two pieces of high magnetic coercivity material may be placed at either end of each of strips 18, 18', with their magnetic poles so arranged as to induce a single pole-pair in each of strips 18, 18'. This configuration of the assembly is thinner but longer than that utilizing a single piece of high coercivity material in an adjacent parallel plane to the permeable strips. Alternatively, the bias field can be supplied by an external field coil pair disposed remotely from the target in the exit or aisleway. In this embodiment, the biasing magnet made of high coercivity material would not be required. Such a target is not readily deactivated in the manner of targets equipped with biasing magnet 44. Further, biasing magnet 44 can comprise a plurality of pieces of high coercivity material, as in the order of up to 10 or more pieces, disposed longitudinally of strips 18, 18'. Accordingly, marker configurations in which the bias field is provided by a hard ferromagnetic material located proximate strips 18, 18' are preferred.

As shown in FIG. 5, a soft, semi-flexible package may be used to protect strips 18, 18' against damping. Thus, strips 18, 18' may be sandwiched between the faces of two pieces of either a flocked or velvet fabric 75. By adjusting the planar dimensions of each piece of the fabric to be somewhat greater than the corresponding aggregate dimensions of the strip 18, the edges of the fabric can be pressed together with adhesive tape 80, glued, heat sealed, sewn or otherwise joined to form a compliant, sealed closure. The desired piece of high coercivity material required for magnetically biasing the strips 18, 18' is then placed on the back surface of one of the fabric pieces, and adhered to it in order to prevent movement relative to the strips 18, 18'. The fabric sandwiched strips 18, 18' are then placed inside an air-tight casing of polymeric film just large enough to contain them. The package is sealed with a quantity of air contained therein to form a pillow-like shape. This package is flexible and smaller in overall volume than is the corresponding rigid package. It is, however, more easily subjected to external pressure, which will damp the vibrations of the strip 18, 18'. This package is readily produced at high speed on standard packaging machinery such as that used to package confectionary or disposable medical supplies.

Unlike markers which generate harmonics of the interrogation frequency in the pickup coil, resonant frequency markers generate a distinctive increase in the voltage induced in the pickup coil when the primary or drive frequency equals the resonant frequency. In the case of harmonic generating markers, the feature which distinguishes the presence of the high magnetic permeability material in the marker from other ferromagnetic materials is the generation of harmonics of high order. Hence, in order to distinguish between the two materials, detection of the presence of these high order harmonics is required. Typically, the voltage of high order harmonics is only a few percent of the voltage of the primary, or drive frequency.

Figure 3:
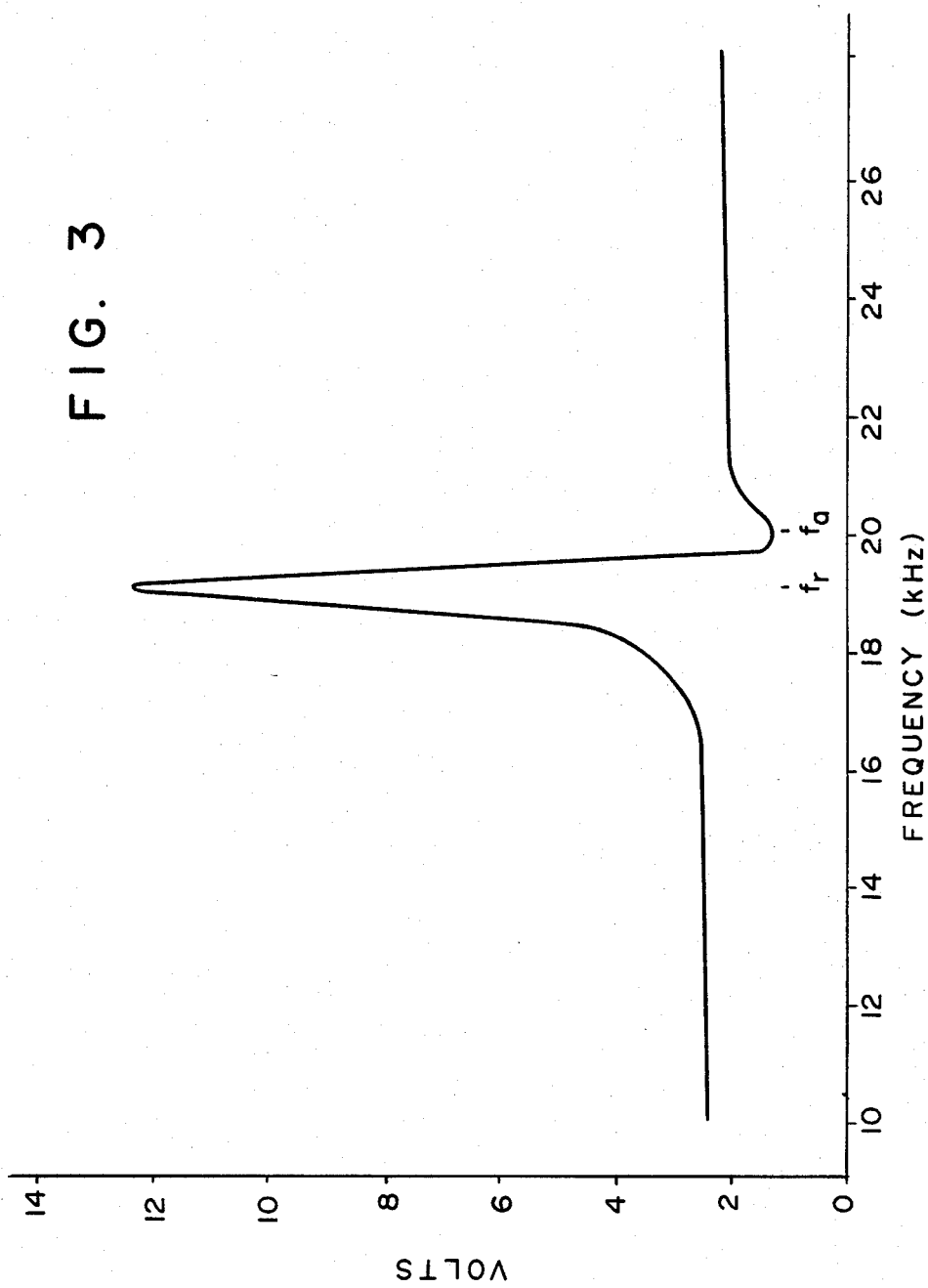
FIG. 3 is a graph showing the voltage induced by magnetomechanical energy exchange of an article surveillance marker over a preselected frequency range.

In contrast, the resonant frequency marker of the present invention is distinguished from other objects by the particular shape of the signal generated in the marker when the drive frequency passes through the preselected resonant frequencies of the marker. Requiring that a bias field be present also facilitates the process of distinguishing the marker from other itmes. The marked effect upon the fundamental frequency voltage induced in the pickup coil by the desired marker makes it easy to detect in the presence of other objects. FIG. 3 shows the increase in induced voltage in a pickup coil caused by the marker when the interrogating field is swept around the resident frequency of the marker. This voltage increase occurs only when the marker is subjected to a magnetic field whose frequency band width includes the resonant frequencies that are preselected for each marker.

Figure 6:
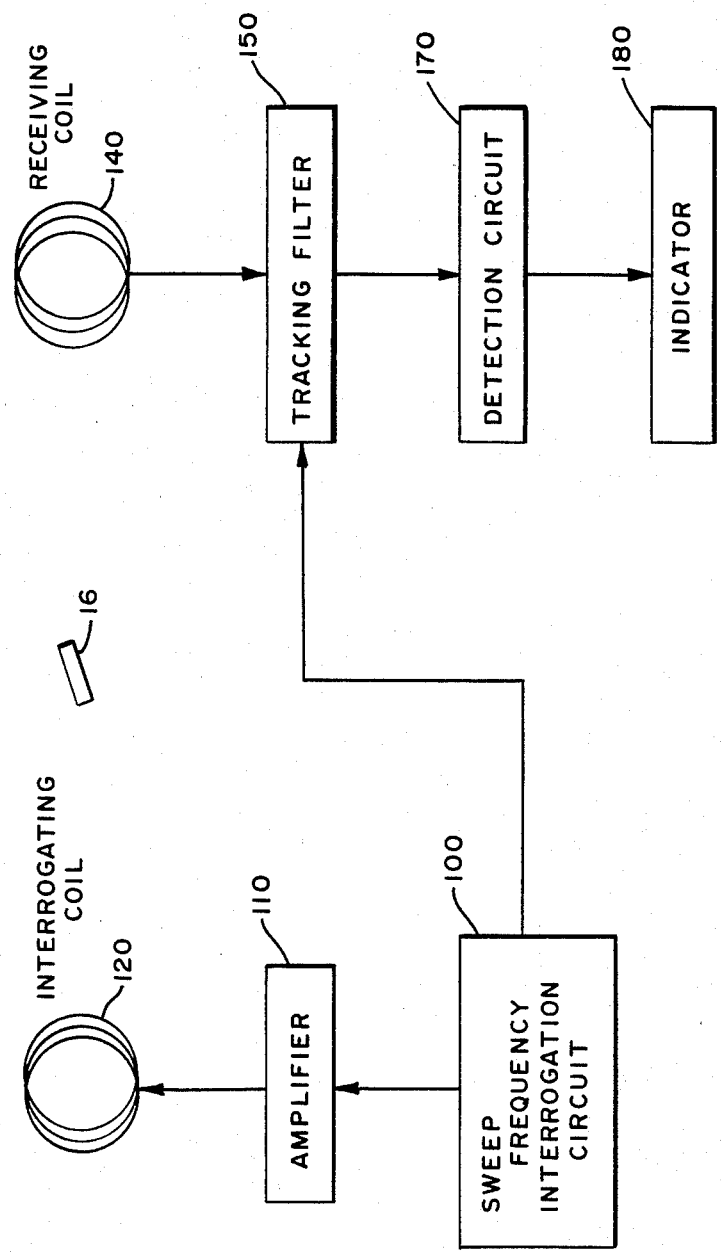
FIG. 6 is a schematic electrical diagram of an interrogation and detection scheme comprising part of the article surveillance system of FIG. 1.

In operation, the system is equipped with an interrogation and detection circuit, shown in FIG. 6. A swept frequency or a dithered frequency oscillator 100, is adjusted with its center frequency approximately equal to that of the markers to be employed. The oscillator 100 drives an amplifier 110 whose output is applied to an interrogation coil 120 such that an ac field is developed in the space through which the marker 130 and other materials are to pass. The interrogation coil 120 is so configured as to provide an essentially uniform flux density in the interrogation zone. This may be accomplished by means of a Helmholtz configuration, or some other suitable arrangement. The amplifier 110 has its impedance matched with that of interrogating coil 120 to maximize the efficiency requirements thereof.

Figure 8:
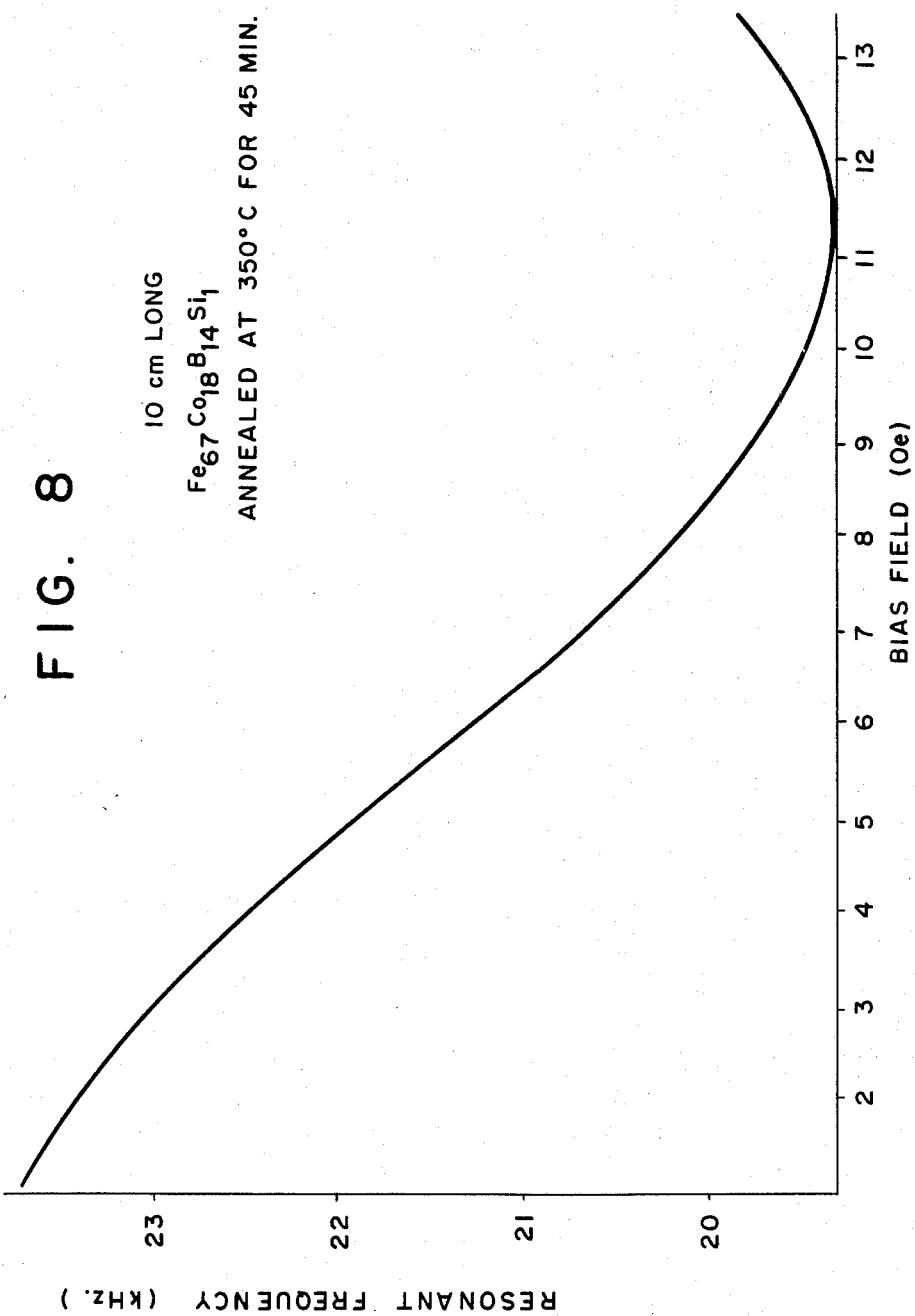
FIG. 8 is a graph depicting the magnetic field dependence of the resonant frequency for an iron-cobalt containing amorphous metal alloy of which an article surveillance system marker is comprised.

The receiving coil 140 is configured in a 'figure 8' arrangement such that, with no permeable material present in the interrogation zone, essentially zero voltage appears at the antenna terminals as a result of flux induced by the drive antenna. The output of this receiving coil is applied to a narrow band pass filter 150, whose center frequency follows that of the drive signal. The signal is then applied to the input of the detector, 170. A signal level above the threshold at the instant that the swept frequencies of the oscillator are equal to the marker resonant frequencies will cause an alarm signal to be generated by the detector. Demagnetization of the biasing magnet by the clerk, upon checkout, alters the resonant frequencies and prevents detection.

The magnitude of the filtered, amplified signal for a variety of articles placed in the interrogation zone depicted in FIG. 6 is set forth in Table 3 below:

TABLE 3

| MATERIAL | STRUCTURE | SIGNAL |
|---|---|---|
| $Fe_{50}Ni_{50}$ | microcrystalline | less than 50 mV |
| Ni | microcrystalline | less than 50 mV |
| $(NiZn)_{0.5}F_2O_4$ | microcrystalline | less than 50 mV |
| $Fe_{40}Ni_{38}Mo_4B_{18}$ | amorphous | 120 V |

One advantage of the frequency synchronized threshold detector shown in FIG. 6 is the relative immunity of the system to electromagnetic interference arising from various radiated or power line conducted sources. To cause an alarm signal, such interference would have to occur only at the resonant frequencies and, in addition be synchronized with the swept frequency. An adaptive threshold detector which integrates and averages the signal presented to it would not trigger an alarm signal from a synchronous or wide-band interference.

Table 4 lists examples of nine different encoded markers. The first six markers contain only one amorphous magnetostrictive element and can, therefore, be distinguished from each other by their own distinct resonant frequency, $f_r$. Markers 7, 8 and 9 have more than one element and can, therefore, be distinguished from other markers by their own distinct set of frequencies.

Table 4 also exhibits how the resonant frequency can be tailored by proper choice of alloy composition, the thermal preparation and geometry of the magnetostrictive element. Thermal preparation or heat treatment is typically done with the element in a saturating magnetic field perpendicular to the element length. Heat treatment at different times or temperatures or in other field orientations or with no field will result in a different resonant frequency. The resonant frequency is also strongly dependent on the magnetic bias field present during operation. FIG. 8 illustrates the magnetic field dependence of the resonant frequency for an iron-cobalt containing amorphous alloy.

TABLE 4

EXAMPLES OF ENCODED MARKERS

| Marker | Element Composition in Atomic % | Thermal Preparation (min at °C.) |
|---|---|---|
| a. Single Magnetostrictive Element Markers | | |
| 1 | $Fe_{79}Si_9B_{13}$ | 15 @ 450 |
| 2 | $Fe_{79}Si_9B_{13}$ | 15 @ 450 |
| 3 | $Fe_{67}Co_{18}B_{14}Si_1$ | 60 @ 350 |
| 4 | $Fe_{67}Co_{18}B_{14}Si_1$ | 60 @ 350 |
| 5 | $Fe_{67}Co_{18}B_{14}Si_1$ | 60 @ 350 |
| 6 | $Fe_{40}Ni_{38}Mo_4B_{18}$ | As-cast |
| b. Multiple Magnetostrictive Element Targets | | |
| 7 | $Fe_{79}Si_9B_{13}$ | 15 @ 450 |
|  | $Fe_{79}Si_9B_{13}$ | 15 @ 450 |
|  | $Fe_{79}Si_5B_{16}$ | 30 @ 425 |
| 8 | $Fe_{79}Si_9B_{13}$ | 15 @ 450 |
|  | $Fe_{79}Si_9B_{13}$ | 15 @ 450 |
|  | $Fe_{79}Si_5B_{16}$ | 30 @ 425 |
|  | $Fe_{79}Si_5B_{16}$ | 30 @ 425 |
|  | $Fe_{40}Ni_{38}Mo_4B_{18}$ | As-cast |
| 9 | $Fe_{79}Si_9B_{13}$ | As-cast |
|  | $Fe_{79}Si_5B_{16}$ | As-cast |
|  | $Fe_{40}Ni_{38}Mo_4B_{18}$ | As-cast |
|  | $Fe_{67}Co_{18}B_{14}Si_1$ | As-cast |

| Marker | Length cm | Bias Field Oe | $f_R$ kHz |
|---|---|---|---|
| a. Single Magnetostrictive Element Markers | | | |
| 1 | 10 | 1 | 14.3 |
| 2 | 9 | 1 | 15.9 |
| 3 | 11 | 10 | 17.6 |
| 4 | 10 | 10 | 19.4 |
| 5 | 10 | 8 | 20.3 |
| 6 | 10 | 5 | 21.8 |
| b. Multiple Magnetostrictive Element Targets | | | |
| 7 | 10 | 1 | 14.3 |
|  | 9 | 1 | 15.9 |
|  | 10 | 1 | 18.2 |
| 8 | 11 | 1 | 13.0 |
|  | 9 | 1 | 15.9 |
|  | 11 | 1 | 16.5 |
|  | 9 | 1 | 20.2 |
|  | 10 | 5 | 21.8 |
| 9 | 11 | 3 | 19.7 |
|  | 12 | 3 | 18.1 |
|  | 10 | 3 | 21.8 |
|  | 10 | 3 | 20.3 |

The article surveillance system 10 which has been disclosed herein can, of course, be modified in numerous ways without departing from the scope of the invention. For example, the hard ferromagnetic element 44 that supplies dc bias to activate the marker may alternatively be used to magnetically saturate the magnetostrictive strips 18, 18' and thereby deactivate the marker 16. The dc bias may be generated (1) by an electric coil, (2) by the earth's field or (3) by utilizing the remanent flux in the magnetostrictive material of strips 18, 18'. The interrogating and receiving coils employed may be separate coils or a single coil that provides the interrogating and receiving functions. Instead of continuously sweeping the interrogation frequency about the resonant frequency of the marker to induce the marker to vibrate, and thereafter detecting the substantial change in induced voltage occurring at the mechanical resonance frequencies of the marker, an interrogating pulse or burst may be used to excite the marker into oscillation. After an interrogating signal of the pulse or burst type is over, the marker will undergo damped oscillation at its resonance frequencies. The vibrating marker will cause a voltage to be induced in the receiving coil at each of the resonance frequencies. Several types of signals can be used to energize the marker. For example, the marker may be energized by a signal having the form of a burst of sine wave frequencies that includes each of the different preselected resonant frequencies of strips 18, 18'. Such signals are appropriate for energization (1) targets of different resonance frequencies and (2) the receive circuitry keyed to discriminate between such targets. Different resonant frequencies are attained by using strips with different magnetostrictive compositions, or by having different strip lengths or by using different bias magnets. The use of multiple magnetostrictive elements with different resonant frequencies permits multiple coding. Other similar modifications can be made which fall within the scope of the present invention. It is accordingly intended that all matter contained in the above description and shown in the accompanying drawings be interpreted as illustrative and not in a limiting sense.

Figure 7:
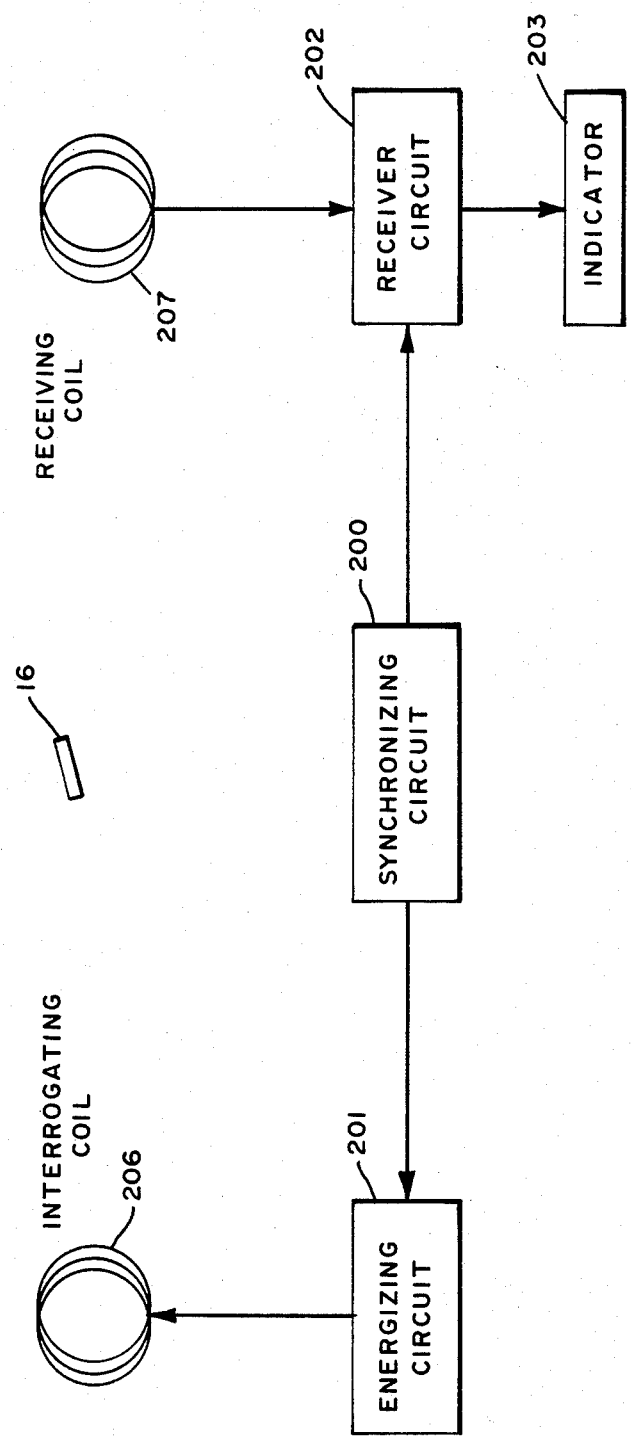
FIG. 7 is a schematic electrical diagram of an interrogation and detection scheme comprising a part of an alternative embodiment of the article surveillance system of FIG. 1.

More specifically, there is illustrated in FIG. 7 an alternative system for interrogating and detecting the marker 16. Synchronizing circuit 200 controls the operation of energizing circuit 201 and receiving circuit 202. The synchronizing circuit 200 sends a synchronizing gate pulse to the energizing circuit 201 which activates the energizing circuit 201. Upon being activated the energizing circuit 201 generates and sends an interrogation signal to interrogating coil 206 for the duration of the synchronizing pulse. An interrogating magnetic field generated by the coil 206 excites marker 16 into mechanical resonance. Upon completion of the interrogating signal, the synchronizing circuit 200 produces a gate pulse to the receiver circuit 202, which activates the receiver circuit 202. During the period that receiver circuit 202 is activated, the marker if present, will generate a signal at the frequencies of mechanical resonance of the marker in receiver coil 207. When the marker frequencies are sensed, by receiver 202, the receiver applies a signal to indicator 203, which records the presence of the marker 16.

The interrogating signal generated by energizing circuit 201 may be a burst of sine wave frequencies that includes each of the different resonant frequencies of the marker 16. Alternatively, the interrogating signal may be an impulse whose width is equal to $1/(2 f_r)$, where $f_r$ is the highest possible marker resonant frequency. In yet another embodiment of the invention, the interrogating signal may be a burst of noise or a composite signal whose frequency spectrum contains the resonant frequencies of all possible markers.

Having thus described the invention in rather full detail, it will be understood that such detail need not be strictly adhered to but that various changes and modifications may suggest themselves to one skilled in the art, all falling within the scope of the invention as defined by the subjoined claims.

What we claim is:

1. For use in a magnetic article surveillance system, a marker adapted to (i) mechanically resonate at preselected frequencies provided by an incident magnetic field applied within an interrogation zone, and (ii) undergo a substantial change in effective magnetic permeability at each of said preselected frequencies that provides said marker with signal identity, said marker comprising a plurality of strips of magnetostrictive ferromagnetic material, each of said strips being adapted to be magnetically biased and thereby armed to resonate at a single, different one of said preselected frequencies, and having a magnetomechanical coupling factor, k, greater than 0, where $k=\sqrt{(1-f_r^2/f_a^2)}$, $f_r$ and $f_a$ being the resonant and antiresonant frequencies, respectively.

2. A marker as recited in claim 1, wherein said material is at least 50 percent amorphous.

3. A marker as recited in claim 2, wherein said material has a composition consisting essentially of the formula $M_aN_bO_cX_dY_eZ_f$, where M is at least one of iron and cobalt, N is nickel, O is at least one of chromium and molybdenum, X is at least one of boron and phosphorous, Y is silicon, Z is carbon, "a"–"f" are in atom percent, "a" ranges from about 35–85, "b" ranges from about 0–45, "c" ranges from about 0–7, "d" ranges from about 5–22, "e" ranges from about 0–15 and "f" ranges from about 0–2, and the sum of d+e+f ranges from about 15–25.

4. A marker as recited in claim 1, wherein said material is at least 80 percent amorphous.

5. A marker as recited in claim 1, wherein each of said strips is sandwiched between the faces of two pieces of fabric, each of said pieces of fabric having planar dimensions greater than the corresponding aggregate dimensions of said strips, said pieces of fabric being joined together at the edges thereof to form fabric sandwiched strips.

6. A marker as recited in claim 5, wherein said fabric sandwich strips are disposed within an airtight casing of polymeric film.

7. A marker as recited in claim 1, wherein said incident magnetic field is swept to provide said frequencies.

8. A marker as recited in claim 1, wherein each of said frequencies is provided in the form of a pulse.

9. A marker as recited in claim 8, wherein each of said pulses has a width equal to $1/(2f_r)$, where $f_r$ is the resonant frequency of said strip.

10. A marker as recited in claim 1, wherein said change in effective magnetic permeability is of the order of 1200%.

11. A marker as recited in claim 1, wherein said strip is magnetically biased by a magnetic bias field ranging from about 0.1 to 20 Oe.

12. A marker as recited in claim 11, wherein said magnetic bias field has a magnitude which yields a maximum k.

13. A marker as recited in claim 1, wherein said strips are annealed in a saturating magnetic field applied thereto in a direction perpendicular to the length thereof.

14. A marker as recited in claim 13, wherein said strips are annealed at a temperature ranging from about 300° to 450° C. for an annealing time ranging from about 7 to 120 min.

15. A marker as recited in claim 1, wherein said marker further comprises at least one ferromagnetic element disposed adjacent to said strips and adapted to magnetically bias said strips and arm them to resonate at said preselected frequencies.

16. A marker as recited in claim 15 wherein said ferromagnetic element has coercivity higher than that of any of the magnetostrictive material of the strips.

17. A marker as recited in claim 15, wherein said ferromagnetic element is adapted to further magnetically bias said strips to decrease resonances and thereby dearm the marker.

18. A marker as recited in claim 15, wherein said material is at least 50 percent amorphous.

19. A marker as recited in claim 18, wherein said ferromagnetic element has coercivity higher than said amorphous material.

20. A marker as recited in claim 15, wherein said material is at least 80 percent amorphous.

21. A marker as recited in claim 20, wherein each of said strips is comprised of amorphous material and said ferromagnetic element comprises a crystalline region of the amorphous material of each strip.

22. A marker as recited in claim 16, wherein said ferromagnetic element comprises a plurality of pieces of high magnetic coercivity material, each of said strips having a different one of said pieces disposed adjacent thereto.

23. An article surveillance system responsive to the presence of at least one of a plurality of markers within an interrogation zone, comprising:
   a. means for defining an interrogation zone;
   b. generating means for generating a magnetic field having a frequency band within said interrogation zone said generating means including an interrogating coil;
   c. a plurality of markers associated with an article appointed for passage through said interrogation zone, each of said markers being adapted to undergo a substantial change in its effective magnetic permeability at a different preselected frequency within said frequency band that provides each of said markers with signal identity, and comprising a strip of magnetostrictive, ferromagnetic material adapted to be magnetically biased and thereby armed to mechanically resonate at a single frequency within the frequency band of said magnetic field, said strip having a magnetomechanical coupling factor, k, greater than 0, where $k = \sqrt{(1 - f_r^2/f_a^2)}$, $f_r$ and $f_a$ being the resonant and anti-resonant frequencies, respectively; and
   d. detecting means for detecting said mechanical resonances of said markers within said interrogation zone at each different preselected frequency.

24. An article surveillance system as recited in claim 23, wherein said generating means includes frequency sweeping means adapted to sweep through each different preselected frequency of said markers.

25. An article surveillance system as recited in claim 23, wherein said generating means includes energizing means adapted to provide said interrogating coil with a burst of sine wave frequencies that includes each said different preselected frequency.

26. An article surveillance system as recited in claim 23, wherein said generating means includes energizing means adapted to provide said interrogating coil with pulses, wherein the width of each pulse is equal to $1/(2f_r)$ where $f_r$ is the preselected frequency.

27. An article surveillance system as recited in claim 23, wherein said generating means includes energizing means adapted to provide said interrogating coil with a burst of noise.

28. An article surveillance system as recited in claim 23, wherein said generating means includes energizing means adapted to provide said interrogating coil with a burst of sweeping sine wave frequency.

29. An article surveillance system as recited in claim 23 wherein said generating means includes energizing means for providing said interrogating coil with an energizing signal, said detecting means includes receiving means for distinguishing a resonant frequency for each of said markers detected by said receiving coil from other frequencies induced therein and said system further includes synchronizing means associated with said energizing means and said receiving means for sequentially activating and deactivating each of said energizing means and said receiving means.

30. An article surveillance system as recited in claim 29, wherein said synchronizing means is adapted to prevent activation of said energizing means for substantially the entire period of time that said receiving means is activated.

31. An article surveillance system as recited in claim 30, wherein said synchronizing means is adapted to prevent activation of said receiving means for substantially the entire period of time that said energizing means is activated.

32. A marker as recited in claim 6, wherein said casing is seated with air contained therein to form a pillow-like shape.

33. An article surveillance system as recited in claim 29, wherein each of said markers comprises a plurality of strips of magnetostrictive, ferromagnetic material and said receiving means is adapted to distinguish all resonant frequencies for each of said markers detected by said receiving coil from other frequencies induced therein.

* * * * *